United States Patent
Hirono

(10) Patent No.: US 6,289,174 B1
(45) Date of Patent: *Sep. 11, 2001

(54) COMPOSITE VIDEO APPARATUS

(75) Inventor: Chiharu Hirono, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 52 days.

(21) Appl. No.: 08/768,839

(22) Filed: Dec. 18, 1996

(30) Foreign Application Priority Data

Dec. 21, 1995 (JP) .................................. 7-349042

(51) Int. Cl.$^7$ ................................................ H04N 5/91
(52) U.S. Cl. .............................. 386/131; 386/1; 348/555; 348/441
(58) Field of Search .................... 386/1, 45, 95, 386/125–126, 46, 131; 369/48; 348/458, 441, 450, 555, 661, 453; H04N 5/91

(56) References Cited

U.S. PATENT DOCUMENTS

| | | | |
|---|---|---|---|
| 4,219,838 | * 8/1980 | Rossi | 348/635 |
| 4,697,176 | * 9/1987 | Kawakami | 340/723 |
| 4,839,746 | * 6/1989 | Kanamaru | 358/342 |
| 5,177,728 | * 1/1993 | Otsubo et al. | 369/48 |
| 5,220,411 | * 6/1993 | Kitaura et al. | 358/19 |
| 5,239,382 | * 8/1993 | Hatakenaka et al. | 358/335 |
| 5,260,801 | * 11/1993 | Temma et al. | 358/335 |
| 5,521,900 | * 5/1996 | Ando et al. | 369/275.1 |
| 5,532,836 | * 7/1996 | Luyckx et al. | 358/335 |
| 5,559,608 | * 9/1996 | Kunihiro | 358/343 |
| 5,561,649 | * 10/1996 | Lee et al. | 369/47 |
| 5,596,565 | * 1/1997 | Yonemitsu et al. | 369/275.3 |
| 5,627,809 | * 5/1997 | Honjo | 369/47 |
| 5,631,712 | * 5/1997 | Suh et al. | 348/705 |
| 5,646,934 | * 7/1997 | Mizuno et al. | 369/290 |
| 5,652,824 | * 7/1997 | Hirayama et al. | 386/95 |
| 5,786,863 | * 7/1998 | Collins | 348/458 |
| 5,999,505 | * 12/1999 | Yasui | 369/48 |

* cited by examiner

*Primary Examiner*—Wendy R. Garber
*Assistant Examiner*—Vincent F. Boccio
(74) *Attorney, Agent, or Firm*—Frommer Lawrence & Haug, LLP.; William S. Frommer; Gordon Kessler

(57) ABSTRACT

The invention provides a composite video apparatus which can display an image from a plurality of image sources with a simple construction and prevents blurring in color of a display image from a particular image source. A memory for storing video data from a certain type of recording medium so as to be outputted for later display is used to perform display outputting of video data reproduced from another type of recording medium or video data extracted from a broadcasting signal. Where the video data to be stored into the memory are formed from brightness signal data and color signal data, a CPU performs, for the video data from a particular video source, conversion of the video data such that the resolution of the brightness signal data may be equal to the resolution of the color signal data and then writes video data obtained by the conversion processing into the memory.

5 Claims, 14 Drawing Sheets

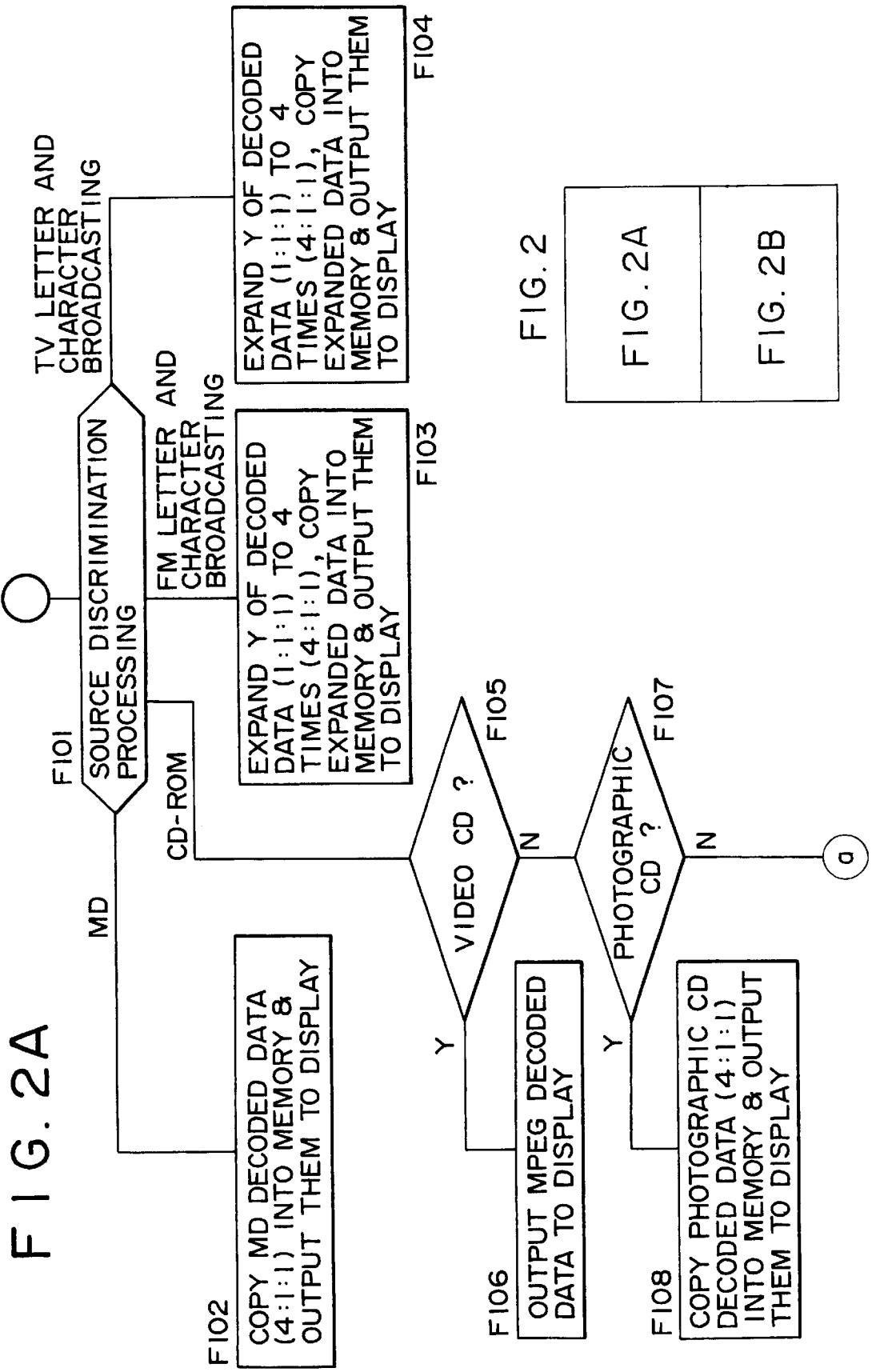

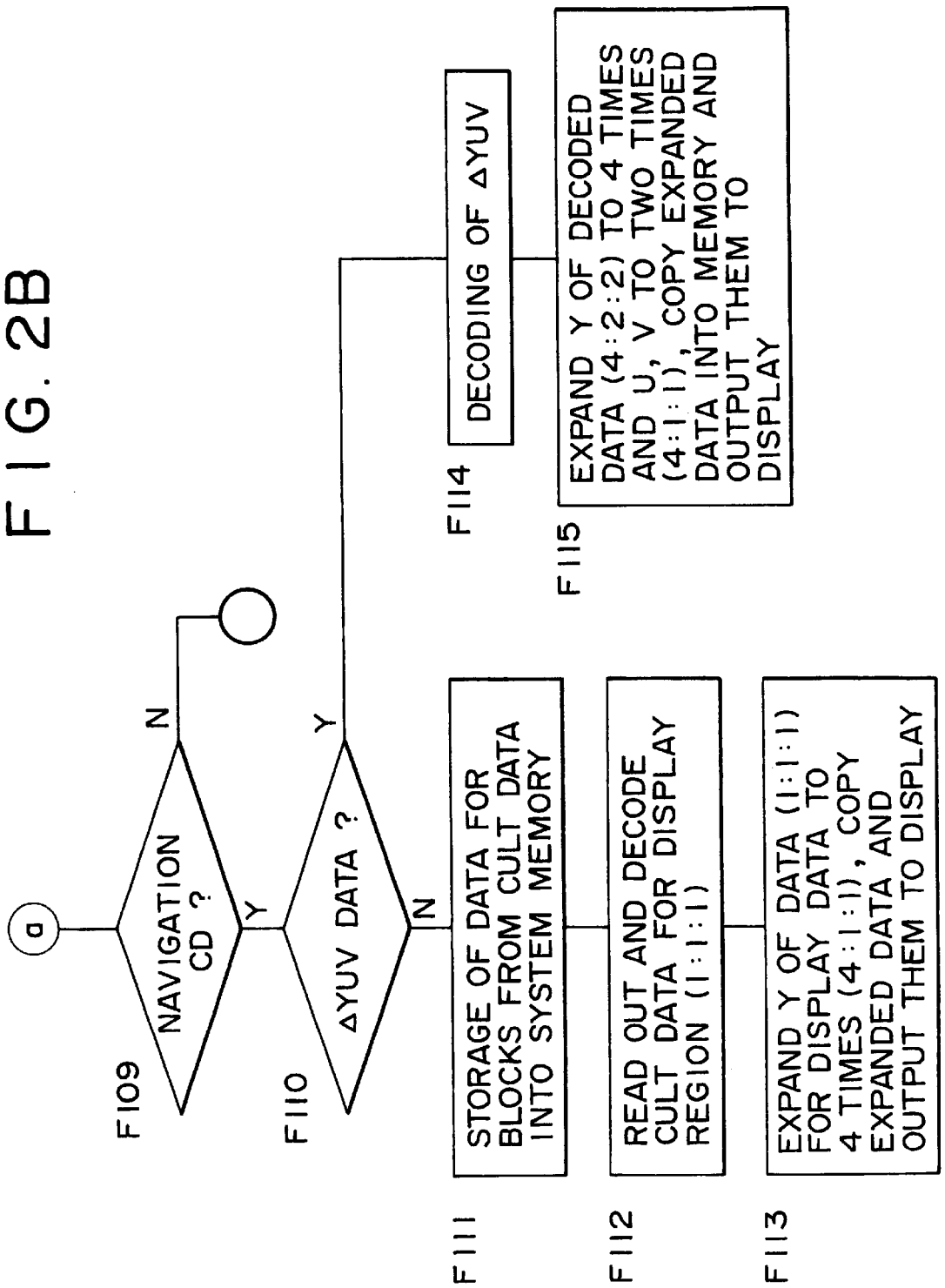

VIDEO CD HIGH DEFINITION MODE (STILL PICTURE), DECODED IMAGE OF MD DATA, DECODED IMAGE OF PHOTOGRAPHIC CD
(4:1:1)

VIDEO CD NORMAL MODE (MOVING PICTURE)

DATA AT DECODING STAGE OF LETTER AND CHARACTER BROADCASTING IMAGE, NAVIGATION CLUT DATA ETC.
(1:1:1)

DATA AT DECODING STAGE OF NAVIGATION ΔYUV DATA
(4:2:2)

FIG. 5

| ADDRESS | DATA (HEXADECIMAL) | DATA (ASCII CHARACTER) |
|---|---|---|
| 0000 | FF FF FF FF FF FF FF FF FF FF FF FF FF FF FF FF | ................ |
| 0010 | FF FF FF FF FF FF FF FF FF FF FF FF FF FF FF FF | ................ |
| 0020 | E1 E1 E1 E1 01 00 00 00 09 09 09 09 EF EF EF EF | ................ |
| 0030 | 01 01 01 01 00 01 01 01 00 00 00 00 36 36 36 36 | ............6666 |
| 0040 | 50 50 50 50 48 48 48 48 4F 4F 4F 4F 54 54 54 54 | PPPPHHHHOOOOTTTT |
| 0050 | 4F 4F 4F 4F 5F 5F 5F 5F 43 43 43 43 44 44 44 44 | 0000____CCCCDDDD |
| 0060 | 00 00 00 00 06 06 06 06 36 36 36 36 FF FF FF FF | ............6666 |
| 0070 | 38 38 38 38 93 93 93 93 E2 E2 E2 E2 2F 2F 2F 2F | 8888紊紊紊紊//// |
| 0080 | 25 25 25 25 50 50 50 50 40 40 40 40 2F 2F 2F 2F | %%%%PPPP@@@@//// |
| 0090 | 25 25 25 25 50 50 50 50 40 40 40 40 00 00 00 00 | %%%%PPPP@@@@.... |
| 00A0 | 0B 0B 0B 0B 01 01 01 01 22 22 22 22 00 00 00 00 | ................ |
| 00B0 | 52 52 52 52 45 45 45 45 05 05 05 05 45 45 45 45 | RRRREEEE....EEEE |
| 00C0 | 34 34 34 34 00 00 00 00 00 00 00 00 00 00 00 00 | 4444............ |
| 00D0 | 00 00 00 00 00 00 00 00 00 00 00 00 00 00 00 00 | ................ |
| 00E0 | 00 00 00 00 00 00 00 00 00 00 00 00 05 05 05 05 | ................ |
| 00F0 | 47 47 47 47 47 47 47 47 01 01 01 01 56 56 56 56 | GGGGGGGG....VVVV |
| 0100 | 00 00 00 00 00 00 00 00 00 00 00 00 0B 0B 0B 0B | ............GGGG |
| 0110 | 56 56 56 56 47 47 47 47 00 00 00 00 00 00 00 00 | VVVVGGGG........ |

PHOTOGRAPHIC CD IDENTIFICATION PROCESSING

FIG. 7A

| ORDER NUMBER | OFFSET | LENGTH | ITEM |
|---|---|---|---|
| 1 | 0 | 9 | (RESERVED) |
| 2 | 9 | 5 | IDENTIFICATION OF VOLUME STRUCTURE |
| 3 | 14 | 1 | SERIAL NUMBER OF VERSION OF VOLUME STRUCTURE |
| 4 | 15 | 1 | (RESERVED) |
| 5 | 16 | 32 | SYSTEM IDENTIFICATION |
| | | | (OMITTED) |

FIG. 7B

| ORDER NUMBER | ITEM NAME | VERSION 1.0 | VERSION 2.0 |
|---|---|---|---|
| 2 | IDENTIFICATION OF VOLUME STRUCTURE | "NSRAJ" | "NSRAJ" |
| 3 | SERIAL NUMBER OF VERSION OF VOLUME STRUCTURE | 01h | 02h |
| 5 | SYSTEM IDENTIFICATION | "NAVIGATION SYSTEM" | "NAVIGATION SYSTEM" |

NAVIGATION DISK IDENTIFICATION PROCESSING

○ : CLUT DATA

CLUT TABLE

| CLUT VALUE | Y | U | V |
|---|---|---|---|
| CL1 | Y1 | U1 | V1 |
| CL2 | Y2 | U2 | V2 |
| CL3 | Y3 | U3 | V3 |
| | | | |

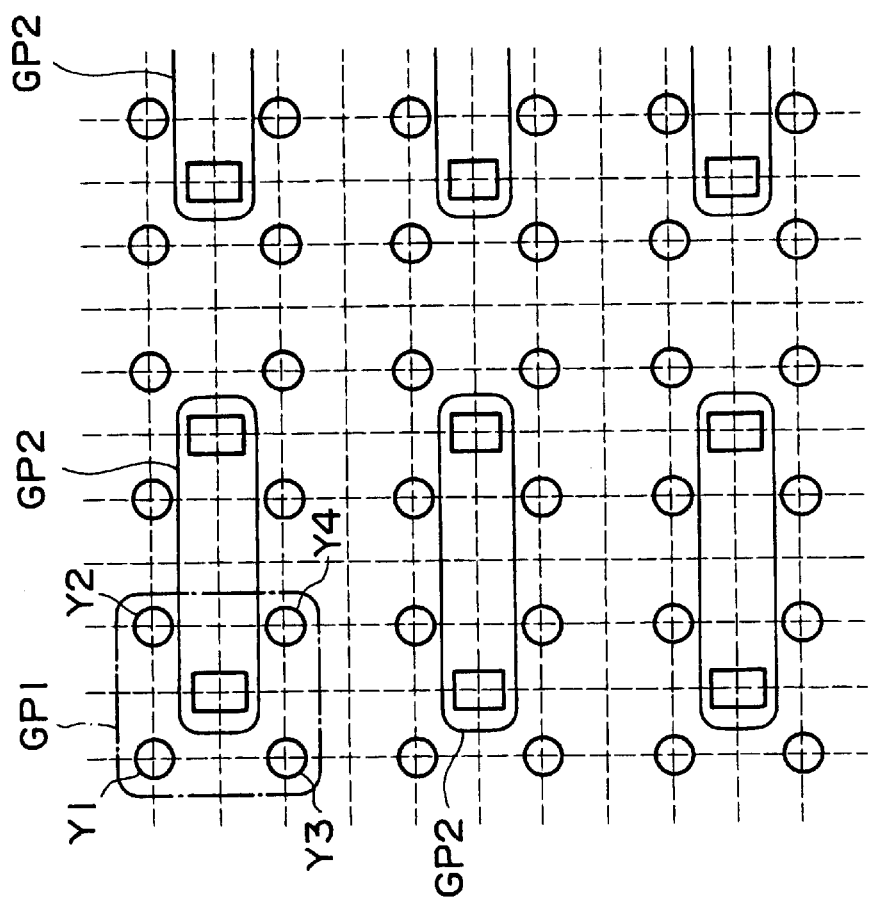

COMPOSITE VIDEO APPARATUS

BACKGROUND OF THE INVENTION

1. Field of the Invention

This invention relates to a composite video apparatus which can selectively display images from various video signal sources such as, for example, a video CD, a picture MD and a letter and character broadcast.

2. Description of the Related Art

Various video signal sources are available including recording media on which video signals are recorded and broadcasting signals from which video signals can be extracted.

Recording media on which video signals are recorded include, for example, various CDs (compact disks) such as video CDs, photographic CDs and navigation disks which are called CD-ROMs on which various video signals are recorded. Also magneto-optical disks called MDs (mini disks) have been spread widely in recent years, and particularly, mini disks on which not only music but also file data or video data can be recorded have been developed. For example, one of such mini disks called picture MD is used as a medium for recording a video signal.

Further, one of broadcasting signals from which video signals can be extracted is a letter and character broadcast in television broadcasting or FM multiplex broadcasting.

By the way, for a composite AV (audio/visual) apparatus for home use, an apparatus which can selectively output an image from such various image sources as mentioned above is demanded. However, such an apparatus as just mentioned has a problem in that a large circuit scale and a high cost cannot be avoided.

For example, in order to make an apparatus compatible with a video CD, a picture MD and a letter and character broadcast, the apparatus must include decoders and display output memories for the individual video apparatus.

Further, while a CD driver and a CD-ROM decoder for a video CD can be used commonly for other CD-ROMS such as a navigation disk and a photographic CD, special decoding processing is required particularly for a navigation disk. This is because special display control is required from, in addition to a function of displaying map information, another function unique to a navigation system of allowing scrolling display in any direction in response to a manual operation of a user. To this end, an LSI for exclusive use for decoding and display output is used frequently. Consequently, where a composite video apparatus is designed so as to be compatible with a navigation disk, a higher cost is required.

OBJECTS AND SUMMARY OF THE INVENTION

Accordingly, it is an object of the present invention to provide a composite video apparatus which can display an image from a plurality of image sources and prevents blurring in color of a display image from a particular image source.

It is another object of the present invention to provide a composite video apparatus wherein video signals reproduced from different recording media and video signals obtained by reception of broadcast letter and character multiplex signals are selectively written into a single memory and a read-out output is displayed by a display unit to achieve simplification in construction.

It is a further object of the present invention to provide a composite video apparatus wherein video data to be stored into memory means are formed from brightness signal data and color signal data and, when a video signal from a particular image source is to be displayed, conversion processing is performed for the video data so that the resolution of the brightness signal data and the resolution of the color signal may be substantially equal to each other and the data obtained by the conversion processing are written into the memory to prevent deterioration in picture quality arising from blurring in color.

In order to attain the objects described above, according to an aspect of the present invention, there is provided a composite video apparatus, comprising decoding means for decoding video data from video signals reproduced from a plurality of different types of recording media and/or from broadcasting signals received, memory means for storing the decoded video data so as to allow later display of the same, and control means for selectively writing and reading out the plurality of video data decoded by the decoding means into and from the memory means, the video data from the plurality of video signal sources being selectively displayed by display means under the control of the control means.

According to another aspect of the present invention, there is provided a composite video apparatus, comprising decoding means for decoding video data from video signals reproduced from a plurality of different types of recording media and/or from broadcasting signals received, memory means for storing the decoded video data so as to allow later display of the same, and control means for selectively writing and reading out the plurality of video data decoded by the decoding means into and from the memory means, the video data to be stored into the memory means being formed from brightness signal data and color signal data, the control means discriminating a particular video source based on an output of discrimination means, which discriminates the types of the video data of the plurality of recording media and/or of the broadcasting signals, and, for particular video data, performing conversion processing of the video data such that the brightness signal data may have a resolution substantially equal to that of the color signal data and then writes the video data obtained by the conversion processing into the memory means.

With the composite video apparatus, since the decoding means for decoding video data of a certain type of recording medium and the memory means for storing the decoded video data so as to be outputted for later display are used to perform display outputting of video data reproduced from another type of recording medium or video data extracted from a broadcasting signal, display memories corresponding to the individual video sources need not be provided. Consequently, the composite video apparatus is advantageous in that it can achieve simplification in circuit construction and reduction in cost.

Further, where the video data to be stored into the memory means are formed from brightness signal data and color signal data, the control means performs, for the video data from a particular video source, for example, for the video data from a letter and character broadcast or a navigation map image, conversion of the video data such that the resolution of the brightness signal data is equal to the resolution of the color signal data and then writes video data obtained by the conversion processing into the memory means. Consequently, the composite video apparatus is advantageous in that otherwise possible deterioration in picture quality arising from blurring in color can be prevented.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a flow chart illustrating image outputting processing of the AV apparatus of FIG. 1;

FIG. 5 is a table illustrating index table areas of a photographic CD;

FIG. 7 is a table illustrating disk labels of a navigation CD;

FIG. 14 is a diagrammatic view illustrating an operation of the AV apparatus of FIG. 1 for converting ΔYUV data of pixels of a display image.

DESCRIPTION OF THE PREFERRED EMBODIMENTS

Figure 1:
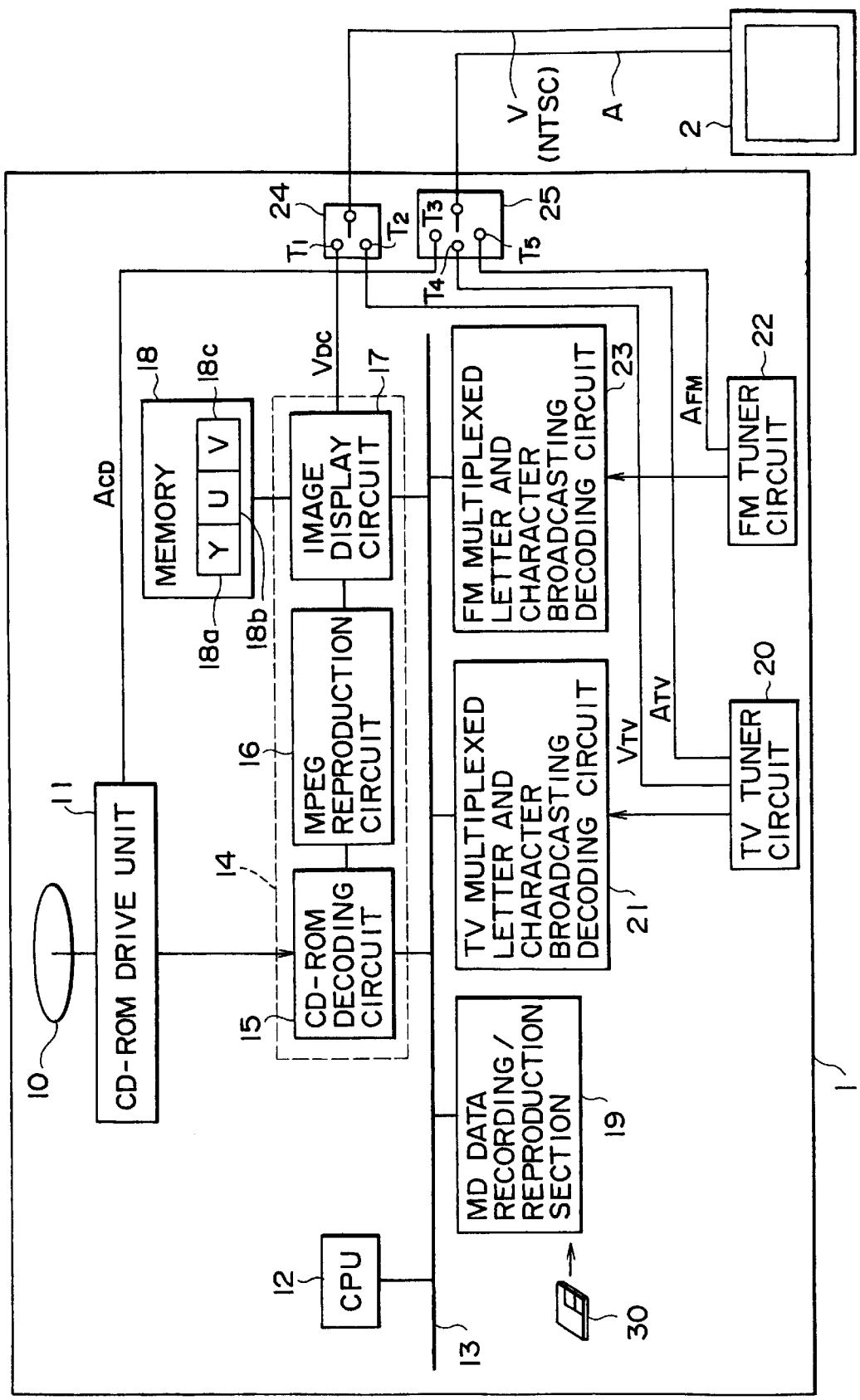
FIG. 1 is a block diagram of an AV apparatus to which the present invention is applied.

A composite video apparatus to which the present invention is applied is shown in FIGS. 1 to 14. The composite video apparatus is formed as an AV apparatus which is compatible with a video CD, a photographic CD, a navigation disk, a picture MD, a television letter and character broadcast and an FM letter and character broadcast. The description is given in the following order:

1. Construction of AV Apparatus
2. Video CD Reproduction Operation
3. Photographic CD Reproduction Operation
4. Picture MD Reproduction Operation
5. Television Letter and Character Broadcast Displaying Operation
6. FM Letter and Character Broadcast Displaying Operation
7. Navigation CD Reproduction operation 1. Construction of AV Apparatus A construction of the AV apparatus is shown in FIG. 1. Referring to FIG. 1, the AV apparatus shown is generally denoted at 1 and connected to a monitor 2. When a video signal V and an audio signal A in the form of, for example, an NTSC signal outputted from the AV apparatus 1 are inputted to the monitor 2, an image and sound are outputted from the monitor 2.

In the AV apparatus 1, a CD 10 is loaded into a CD-ROM drive unit 11. The CD 10 is a disk which comes within the category of CD-ROM media and may be a CD for music, a video CD, a photographic CD or a navigation CD-ROM (navigation CD). The CD-ROM drive unit 11 can reproduce the CD 10 whichever of them the CD 10 is.

An audio signal $A_{CD}$ reproduced from the CD 10 is supplied to a $T_3$ terminal of an audio switch 25. Meanwhile, video data read out from the CD 10 are supplied to a CD-ROM decoding circuit 15 of an image reproduction LSI 14.

The CD-ROM decoding circuit 15 performs decoding processing based on a CD-ROM format to extract various data such as video data.

Where the CD 10 is a video CD, a video signal decoded by the CD-ROM decoding circuit 15 is subject to decoding processing of the MPEG (Moving Picture Expert Group) system by an MPEG reproduction circuit 16 so that video data in the form of R, G and B are extracted from video data compressed in the form of I pictures, B pictures and P pictures. The video data in the form of R, G and B are converted into a brightness signal (Y signal) and color difference signals (R-Y, B-Y) and written into a memory 18 via an image display circuit 17. The memory 18 functions as a display memory, and video data written in the memory 18 are converted into an NTSC signal by the image display circuit 17 and outputted as a video signal $V_{DC}$. The video signal $V_{DC}$ is supplied to a $T_1$ terminal of an image switch 24.

In short, the image data written in the memory 18 are outputted as image data for display outputting, and when the image switch 24 is connected to the $T_1$ terminal, display is performed by the monitor 2 based on the image data written in the memory 18.

If the color difference signal (R-Y) is referred to as U signal and the color difference signal (B-Y) is referred to as V signal, the memory 18 includes a Y signal storage region 18a, a U signal storage region 18b and a V signal storage region 18c. In short, a color image of one frame is formed from 3 units of data (Y, U and V).

A mini disk (MD) 30 is loaded into an MD data recording/reproduction section 19, by which a recording or reproduction operation of the mini disk 30 is performed. For example, where the mini disk 30 is formed as a picture MD, reproduction processing of video data from the mini disk 30 is performed. The video data are supplied to the image display circuit 17 via a CPU bus 13.

A TV tuner circuit 20 performs a channel selection operation from television broadcasting signals and extracts a video signal $V_{TV}$ and an audio signal $A_{TV}$ being broadcast. The video signal $V_{TV}$ is supplied to a $T_2$ terminal of the image switch 24 while the audio signal $A_{TV}$ is supplied to a $T_4$ terminal of the audio switch 25.

In television broadcasting, letter and character broadcasting (hereinafter referred to as television letter and character broadcast or broadcasting) wherein letter and character information is superimposed in a vertical blanking period is performed. Data of a television letter and character broadcast are extracted by a TV multiplexed letter and character broadcasting decoding circuit 21. Video data for display based on the extracted letter and character broadcast data are supplied to the image display circuit 17 via the CPU bus 13.

An FM tuner circuit 22 performs a channel selection operation from FM radio broadcasting signals and extracts an audio signal $A_{FM}$ being broadcast. The audio signal $A_{FM}$ is supplied to a $T_5$ terminal of the audio switch 25.

In FM radio broadcasting, letter and character broadcasting (hereinafter referred to as FM letter and character broadcast or broadcasting) wherein letter and character information and so forth are superimposed as known as FM multiplexed broadcasting. Data of an FM letter and character broadcast modulated with a sub carrier are extracted by an FM multiplexed letter and character broadcasting decoding circuit 23. Video data for display based on the extracted letter and character broadcast data are supplied to the image display circuit 17 via the CPU bus 13.

A CPU 12 functions as a control section for controlling operation of the entire apparatus, and performs transmission of control signals and transmission of data to the various components of the apparatus via the CPU bus 13.

Particularly, the CPU 12 controls a supplying operation to the image display circuit 17 of video data outputted from the CD-ROM drive unit 11, MD data recording/reproduction section 19, TV multiplexed letter and character broadcasting decoding circuit 21 or FM multiplexed letter and character broadcasting decoding circuit 23 and a writing operation of such video data into the memory 18 via the image display circuit 17. The CPU 12 performs also required working processing of video data to be written into the memory 18. Those processes will be hereinafter described.

Various images and sounds from various sources can be enjoyed by means of the AV apparatus 1 and the monitor 2 described above.

First, when the image switch 24 is connected to the $T_2$ terminal and the audio switch 25 is connected to the $T_4$ terminal, an image and sound of a television broadcast obtained from the TV tuner circuit 20 are outputted from the monitor 20. On the other hand, when the image switch 24 is connected to the $T_1$ terminal, image display of a television letter and character broadcast extracted by the TV multiplexed letter and character broadcasting decoding circuit 21 is performed by the monitor 2.

In contrast, when the audio switch 25 is connected to the $T_5$ terminal, sound of an FM broadcast obtained from the FM tuner circuit 22 is outputted from the monitor 2. Further, in this instance, if the image switch 24 is connected to the $T_1$ terminal, then image display of an FM letter and character broadcast extracted by the FM multiplexed letter and character broadcasting decoding circuit 23 is performed by the monitor 2.

When the mini disk 30 is reproduced by the MD data recording/reproduction section 19 while the image switch 24 is connected to the $T_1$ terminal, an image reproduced by the monitor 2 is displayed.

Further, when the CD 10 is reproduced by the CD-ROM drive unit 11 while the image switch 24 is connected to the $T_1$ terminal, an image reproduced from the CD 10 is displayed on the monitor 2.

2. Video CD Reproduction Operation

Operation of the AV apparatus 1 when the CD 10 reproduced by the CD-ROM drive unit 11 is a video CD will be described with reference to FIGS. 2, 3 and 4.

FIG. 2 is a flow chart illustrating control processing by the CPU 12.

When an instruction for reproduction by the CD-ROM drive unit 11 is entered by a user, the CPU 12 discriminates, as source discrimination processing in step F101, that a reproduction operation should be performed using the CD 10 (CD-ROM) as a source. The CPU 12 thus instructs the CD-ROM drive unit 11 to execute a reproduction operation. Then, the processing of the CPU 12 advances to step F105 in order to discriminate the type of the CD 10 to be reproduced.

For discrimination of the type of the CD 10, for example, TOC information and other necessary data are read in from the CD 10.

Figure 4A:
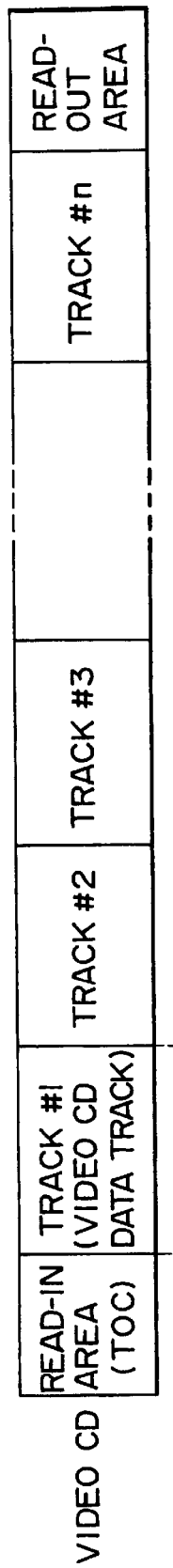
FIGS. 4A and 4B are diagrammatic views showing a track format of a video CD.

When the CD 10 is a video CD, the disk has such a track format as shown in FIG. 4A.

The video CD has provided on the innermost circumference side of the disk a read-in area, in which TOC data are recorded. Then, next to the read-in area, tracks #1 to #n are recorded, and a read-out area is provided on the outermost circumference position. Recorded as the TOC data are start positions of individual tracks, a number of the tracks, a play time and so forth.

The track #1 is not used for recording of actual video or audio data as a first track, but is used as a video CD data track, and actual video/audio data are recorded on the tracks #2 to #n.

Figure 4B:
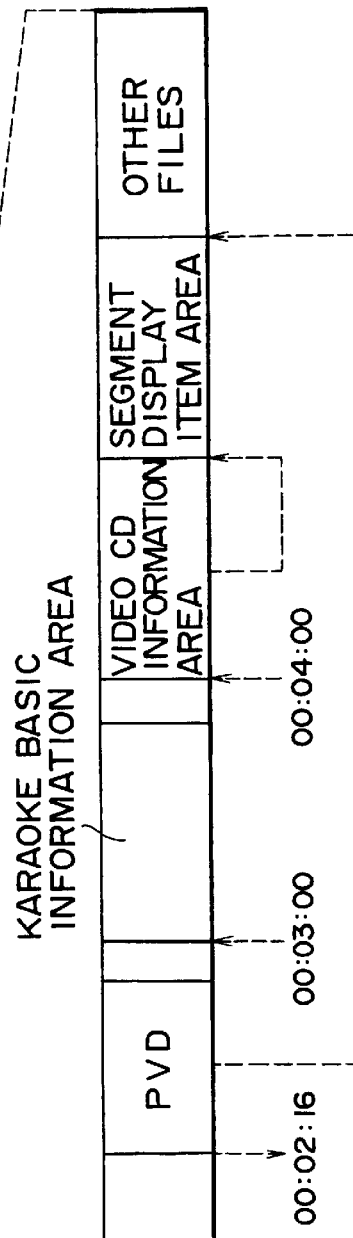

In the video CD data track for which the track #1 is used, a PVD (principal volume descriptor), a karaoke basic information area, a video CD information area, a segment play item area and other files (CD-I application programs and so forth) are prepared as shown in FIG. 4B.

Among them, in the PVD (principal volume descriptor) disposed at a position beginning with an absolute time address 00:02:16 (minute/second/frame) on the disk, various pieces of basic management information such as a volume structure standard ID, a system identifier, a volume identifier, a volume number of an album and an album set sequence number are described. Accordingly, by reading in the data of the PVD, the CPU 12 can discriminate that the CD to be reproduced is a video CD. A video CD can be discriminated also by detecting a synchronizing signal recorded for synchronization between audio data and video data.

When the CD to be reproduced is a video CD, the CPU 12 advances its processing to step F106, in which it controls the image reproduction LSI 14 to execute decoding and display outputting for the video CD.

The image reproduction LSI 14 thus executes decoding of MPEG data as described hereinabove.

In the display outputting processing, the CPU 12 stores decoded video data in the form of Y/U/V signals into the memory 18 and uses them as display output data.

By the way, the MPEG system has, as an image display mode, a normal mode and a high definition mode.

The normal mode is normally used for moving picture data, and video data in the normal mode are data of a matrix of pixels including 240 pixels in a column and 352 pixels in a row.

Meanwhile, the high definition mode is used for still picture data, and video data in the high definition mode are data of a matrix of pixels including 480 pixels in a column and 704 pixels in a row.

Figure 3A:
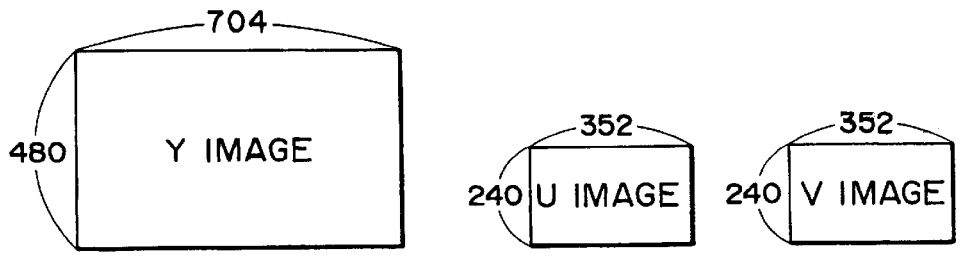
FIGS. 3A to 3D are diagrammatic views illustrating various image data used in the AV apparatus of FIG. 1.

When data of the high definition mode are considered in the form of Y/U/V signals, they have a ratio of 4:1:1 in data amount. In particular, data of the Y signal are written as data of a matrix of pixels including 480 pixels in a column and 704 pixels in a row into the memory 18 as seen in FIG. 3A. Meanwhile, data of the U signal or the V signal are written as data of a matrix including 240 pixels in a column and 352 pixels in a row into the memory 18.

Figure 3B:
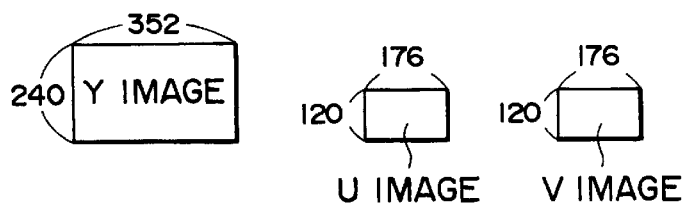

When data of the normal mode are considered in the form of Y/U/V signals, they have a ratio of 4:1:1 in data amount similarly. However, data of the Y signal are written as data of a matrix of pixels including 240 pixels in a column and 352 pixels in a row as seen in FIG. 3B. Meanwhile, data of the U signal or the V signal are written as data of another matrix of pixels including 120 pixels in a column and 176 pixels in a row.

While the two modes are selectively used for moving pictures and still pictures, in any case, display outputting on the monitor 2 is performed based on Y/U/V signals written in the memory 18.

3. Photographic CD Reproduction Operation

Operation of the AV apparatus 1 when the CD 10 to be reproduced by the CD-ROM drive unit 11 is a photographic CD will be described with reference to FIGS. 2, 3A to 3D, 5 and 6.

If an instruction for reproduction by the CD-ROM drive unit 11 is entered by a user, then the CPU 12 discriminates, as the source discrimination processing in step F101 of FIG. 2, that a reproduction operation should be performed using the CD 10 (CD-ROM) as a source, and instructs the CD-ROM drive unit 11 to execute a reproduction operation. Then, the processing of the CPU 12 advances to step F105 in order to discriminate the type of the CD 10 to be reproduced. Then, if it is discriminated in step F105 that the CD 10 is not a video CD, the CPU 12 discriminates in step F107 whether or not the CD 10 is a photographic CD.

In a photographic CD, 16 sectors beginning with the 00 minute, 02 second, 00 frame in absolute address make a region called index table area.

Those 16 sectors are divided into two groups each including 8 sectors, and in one of the groups of 8 sectors, the first, second, third and fourth sectors have same contents as those of the fifth, sixth, seventh and eighth sectors, respectively.

An example of a result of dumping of contents of the sector (first sector) beginning with the 00 minute, 02 second, 00 frame in absolute address is illustrated in FIG. 5. Data of each byte is represented in a hexadecimal number, and on the right-hand side column, ascii characters corresponding to the individual byte data are indicated.

In a photographic CD, data underscored in FIG. 5 represent "PPPPHHHHOOOOTTTTOOOO_CCCCDDDD" in ascii character, which represent the same significance as a character train of "PHOTO CD". This functions as a disk signature, and consequently, it is indicated by the character train that this disk is a photographic CD.

Figure 6:
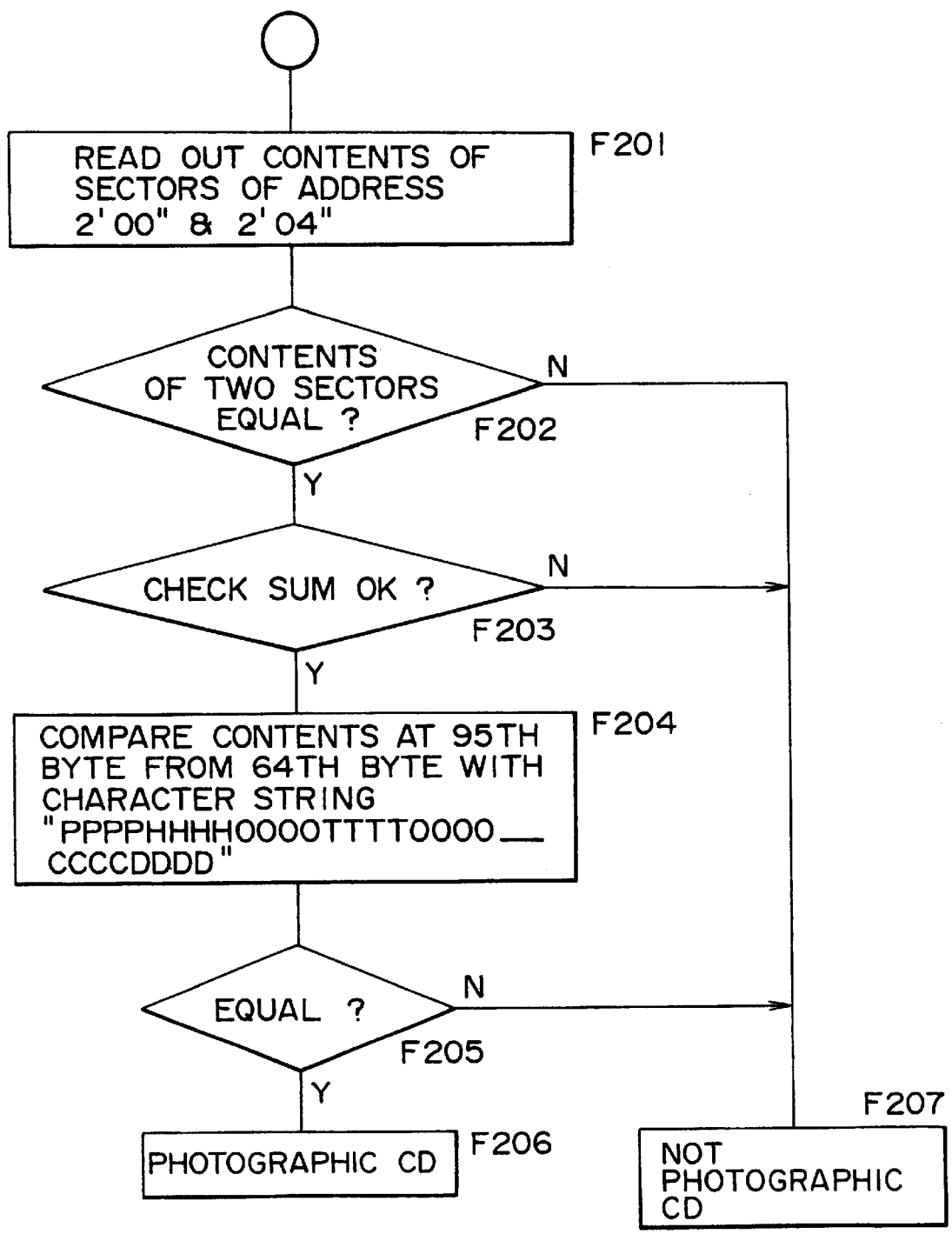
FIG. 6 is a flow chart illustrating photographic CD identification processing by the AV apparatus of FIG. 1.

Accordingly, such processing as illustrated in FIG. 6 should be performed by the CPU 12 in order to discriminate in step F107 whether or not the CD 10 to be reproduced is a photographic CD.

Referring to FIG. 6, the CPU 12 reads out, first at step F201, a sector (first sector) beginning with the 00 minute, 02 second, 00 frame in absolute address and another sector (fifth sector) beginning with the 00 minute, 02 second, 04 frame.

If the CD 10 is a photographic CD, then the first and fifth sectors must have same contents with each other, and accordingly, if the first and fifth sectors do not have same contents, then the processing advances from step F202 to step F207, in which the CPU 12 determines that the CD 10 is not a photographic CD.

If the first and fifth sectors have same contents, then the CPU 12 performs discrimination of check sums in step F203, and if the check sums are not OK, then the processing advances to step F207, in which the CPU 12 determines that the CD 10 is not a photographic CD.

If the check sums are OK in step F203, then the CPU 12 compares contents of the 64th to 95th bytes of the fist sector with the character train "PPPPHHHHOOOOTTTTOOOO_CCCCDDDD". If the CD 10 is a photographic CD, then the contents of the 64th to 95th bytes of the first sector must be "PPPPHHHHOOOOTTTTOOOO_CCCCDDDD". Accordingly, when the result of the comparison exhibits coincidence, the processing advances from step F205 to step F260, in which the CPU 12 discriminates that the CD 10 is a photographic CD. If the result of the comparison in step F204 exhibits incoincidence, the processing advances to step F207, in which the CPU 12 determines that the CD 10 is not a photographic CD.

If it is discriminated in step F107 of FIG. 2 by such processing as described above that the CD 10 is a photographic CD, the the CPU 12 advances its processing to step F108, in which the CPU 12 controls the image reproduction LSI 14 to execute decoding and display outputting processing for a photographic CD.

In this instance, the CPU 12 sends photographic CD reproduction image data decoded by the CD-ROM decoding circuit 15 to the image display circuit 17 so that they may be written into the memory 18. Then, the CPU 12 controls the memory 18 to execute outputting of display data based on the contents of the image data written in the memory 18 so that a reproduction image from the photographic CD may be displayed on the monitor 2.

Also video data reproduced from a photographic CD are stored in the form of Y/U/V signals into the memory 18. In this instance, the decoded video data are data of a matrix of pixels including 480 pixels in a column and 704 pixels in a row similarly to data in the high definition mode of the MPEG system. Then, also in this instance, the data amounts considered in the form of Y/U/V signals exhibit a ratio of 4:1:1. Thus, data of the Y signal are written as data of a matrix of pixels including 480 pixels in a column and 704 pixels in a row into the memory 18 as seen in FIG. 3A, and data of the U signal or the V signal are written as data of another matrix including 240 pixels in a column and 352 pixels in a row into the memory 18.

4. Picture MD Reproduction Operation

Operation of the AV apparatus 1 when reproduction of the mini disk 30 as a picture MD is performed by the MD data recording/reproduction section 19 will be described with reference to FIGS. 2 and 3A to 3D.

If an instruction for reproduction by the MD data recording/reproduction section 19 is entered by a user, the CPU 12 discriminates, as the source discrimination processing in step F101 of FIG. 2, that a reproduction operation should be performed using the mini disk 30 as a source. Then in step F102, the CPU 12 instructs the MD data recording/reproduction section 19 to execute a reproduction operation. Then, the CPU 12 controls the image display circuit 17 to write reproduced video data into the memory 18.

Also video data reproduced from the mini disk 30 are stored in the form of Y/U/V signals into the memory 18, and also video data decoded by the MD data recording/reproduction section 19 are data of a matrix of pixels including 480 pixels in a column and 704 pixels in a row similarly to data in the high definition mode in the MPEG system. Further, also in this instance, the data amounts considered in the form of Y/U/V signals exhibit a ratio of 4:1:1. Thus, data of the Y signal are written as data of a matrix including 480 pixels in a column and 704 pixels in a row into the memory 18 as seen in FIG. 3A, and data of the U signal or the V signal are written as data of another matrix including 240 pixels in a column and 352 pixels in a row into the memory 18.

Also upon reproduction of the MD 30, display outputting of the monitor 2 is performed based on the Y/U/V signals written in the memory 18.

5. Television Letter and Character Broadcast Displaying Operation

Operation of the AV apparatus 1 when an image is displayed based on a television letter and character broadcast will be described below with reference to FIGS. 2, 3A to 3D and 9.

If an instruction for outputting of a television letter and character broadcast is entered by a user, then the CPU 12 discriminates, as the source discrimination processing in step F101 in FIG. 2, that an image outputting operation should be performed using the TV multiplexed letter and character broadcasting decoding circuit 21 as a source. Then, the CPU 12 instructs the TV multiplexed letter and character broadcasting decoding circuit 21 to execute an operation to extract letter and character broadcasting data from a broadcasting signal received and demodulated by the TV tuner circuit 20 and an outputting operation of video data based on the extracted data. Then, the CPU 12 writes, as the processing in step F104, the video data thus outputted into the memory 18 via the image display circuit 17.

By the way, video data originating from a letter and character broadcast are produced by generating, based on character data extracted from the broadcast, pattern image signals in the TV multiplexed letter and character broadcasting decoding circuit 21 by means of, for example, a character generator.

Video data of such a pattern image as originates from a letter and character broadcast or from computer graphics in most cases exhibit a greater variation in contrast or color within an image than a natural image, and where data have such a form that color difference information exhibits a rougher resolution than brightness information, blurring in color sometimes occurs on the display screen.

For example, if it is intended to draw a colored straight line, such an image display is provided that color protrudes from a dark straight line on the display screen.

When the form of video data stored in the memory 18 is considered here, the ratio in amount of data of Y:U:V is 4:1:1, and the resolution of the color difference signals is lower than that of the brightness signal. Although this little matters where such video data of a video CD, a photographic CD or a picture MD as described above are, for example, natural pictures, if it is tried to fetch video data originating from a letter and character broadcast into the memory 18 and output them so that they may be displayed, then there is the possibility that blurring in color may occur.

Figure 3C:
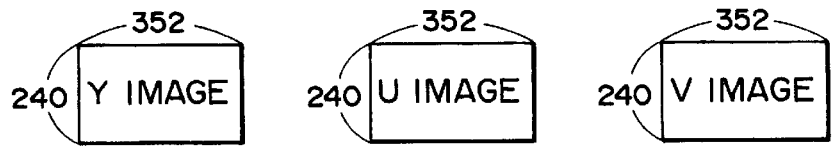

Therefore, in the processing in step F104 in the present picture MD reproduction operation, the form of video data in a stage in which the video data are outputted from the TV multiplexed letter and character broadcasting decoding circuit 21 is changed such that data of each of the Y signal, U signal and V signal may make a matrix of pixels including 240 pixels in a column and 352 pixels in a row as seen in FIG. 3C so that they may have a ratio of 1:1:1 in data amount. Then, the CPU 12 writes the Y signal into the memory 18 after it expands the amount of data of the Y signal to four times so that the ratio in data amount of the Y signal, U signal and V signal may be 4:1:1.

Figure 9:
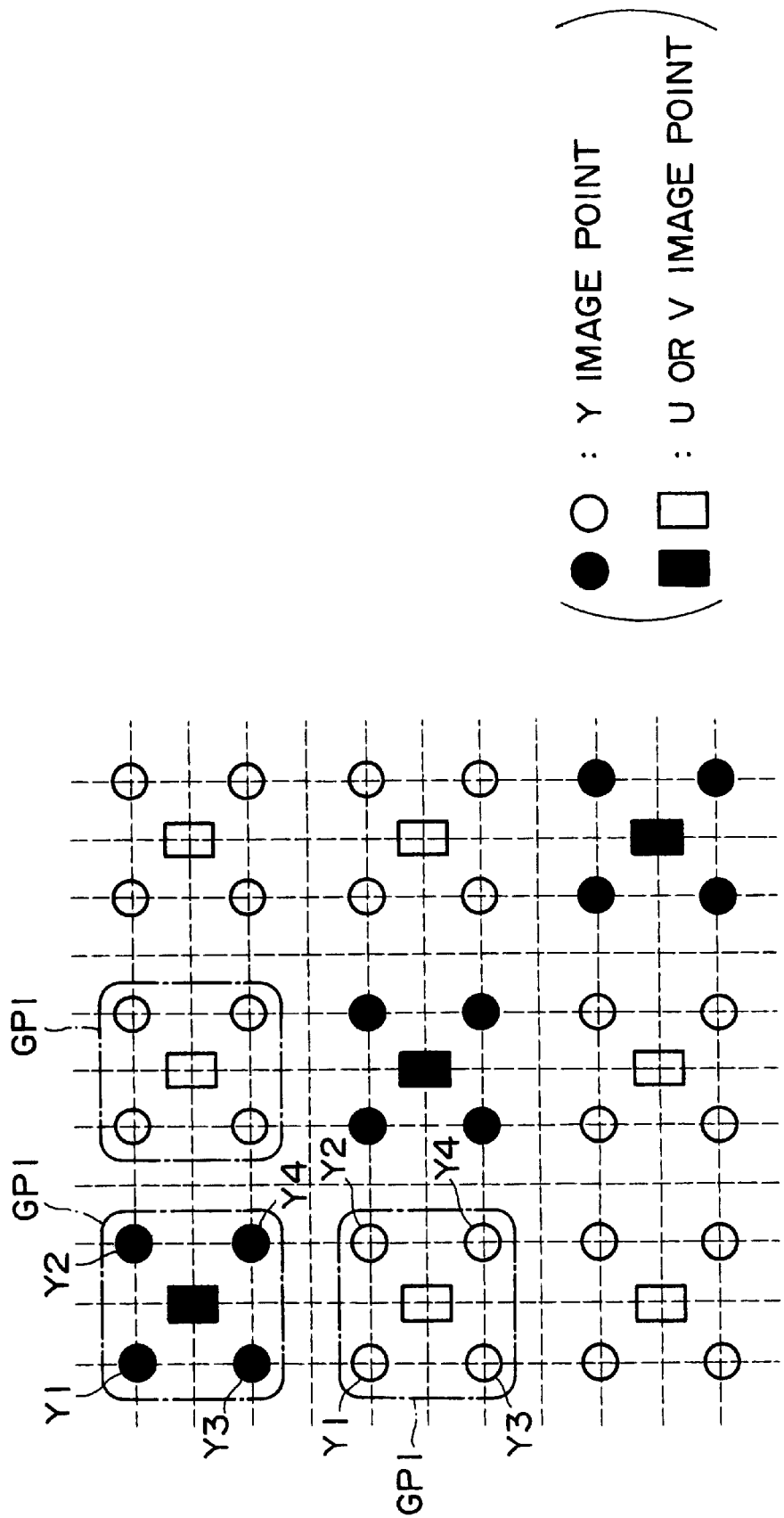
FIG. 9 is a diagrammatic view illustrating an operation of the AV apparatus of FIG. 1 for converting data of pixels of a display image.

This operation will be described with reference to FIG. 9. FIG. 9 schematically illustrates states (spatial arrangements) of pixels of a display image. In FIG. 9, the mark "○" or "●" indicates a Y image point, and the mark "□" or "■" indicates a U or V image point. Further, FIG. 9 shows an image where a straight line is drawn from the left upper corner to the lower right corner.

It can be seen from FIG. 9 that one U or V image point is arranged for each four Y image points, and one group GP1 is formed from those five image points. In each group GP1, only one U or V image point is provided for four Y image points, and this signifies that a U or V image has just half resolutions in the vertical and horizontal directions with respect to a Y image. Accordingly, colors of four Y image points (Y1, Y2, Y3, Y4) in one group are determined by one U or V image point.

Due to such a spatial arrangement as described above, where an image has a high contrast, if the value in brightness is different among the four Y image points (Y1, Y2, Y3 and Y4), then blurring in color occurs. However, in the operation illustrated in FIG. 9, from among the Y signal, U signal and V signal whose data amount ratio is 1:1:1 in a stage in which they are outputted as decoding outputs, only the Y signal is expanded to four times before it is stored into the memory 18 as described hereinabove. In short, from one Y signal value corresponding to a U signal or a V signal, four Y signal data of an equal value are produced and used as data of Y image points (Y1, Y2, Y3, Y4) in one group.

In other words, from the point of view of the brightness data values, Y1=Y2=Y3=Y4.

By this countermeasure, from the same entire group GP1, a square wherein two pixels in each column and two pixels in each row are painted up with the same color is drawn, and no blurring in color is caused by the square.

In the present operation, when one image point is drawn as a Y image, it is drawn in units of a matrix of pixels including 2 pixels in a column and 2 pixels in a row in this manner so that occurrence of blurring in color on the screen of a television letter and character broadcast may be prevented.

6. FM Letter and Character Broadcast Displaying Operation

Operation of the AV apparatus 1 when image display is performed based on an FM letter and character broadcast will be described below.

If an instruction to output an FM letter and character broadcast is entered by a user, then the CPU 12 determines, as the source discrimination processing in step F101 of FIG. 2, that an image outputting operation should be performed using the FM multiplexed letter and character broadcasting decoding circuit 23 as a source. The CPU 12 thus instructs the FM multiplexed letter and character broadcasting decoding circuit 23 to execute an operation of extracting letter and character broadcast data from a broadcasting signal received and demodulated by the FM tuner circuit 22 and another operation of outputting the image data based on the extracted data. Then, as the processing in step F105, the CPU 12 writes the video data to be outputted into the memory 18 via the image display circuit 17.

Also in this instance, the circumstances are similar to those for a television letter and character broadcast, and in order to prevent blurring in color on a display image, in the processing in step F103, the form of video data in a stage in which they are outputted from the FM multiplexed letter and character broadcasting decoding circuit 23 is changed such that data of each of the Y signal, U signal and V signal are arranged in a matrix of pixels including 240 pixels in a column and 352 pixels in a row so that the ratio in data amount may be 1:1:1 as seen in FIG. 3C. Then, the CPU 12 expands the data of the Y signal to 4 times in data amount so that the ratio in amount of data among the Y signal, U signal and V signal may be 4:1:1, and resulting data are written into the memory 18.

In particular, an image is drawn such that, from the point of view of the brightness data values, Y1=Y2=Y3=Y4 may be satisfied as described hereinabove with reference to FIG. 9, that is, when one image point is to be drawn as a Y image, it is drawn in units of a matrix of pixels including 2 pixels in a column and 2 pixels in a row so that occurrence of blurring in color on the screen of an FM letter and character broadcast may be prevented.

7. Navigation CD Reproduction Operation

Operation of the AV apparatus 1 when the CD 10 to be reproduced by the CD-ROM drive unit 11 is a navigation CD will be described with reference to FIGS. 2, 3, 7A and 7B and 8 to 14.

When an instruction for reproduction by the CD-ROM drive unit 11 is entered by a user, the CPU 12 determines, as the source discrimination processing in step F101 of FIG. 2, that a reproduction operation should be performed using the CD 10 (CD-ROM) as a source. The CPU 12 thus instructs the CD-ROM drive unit 11 to execute a reproduction operation. Then, the processing of the CPU 12 advances to step F105 in order to discriminate the type of the CD 10 to be reproduced. Then, if it is discriminated in step F105 that the CD 10 is not a video CD, then the CPU 12 discriminates in step F107 whether or not the CD 10 is a photographic CD. Further, if it is discriminated that the CD 10 is not a photographic CD, the CPU 12 discriminates in step F109 whether or not the CD 10 is a navigation CD.

According to the "Unified Format for Maps and Data of CD-ROMs for the Navigation System" provided by the Society for the Study of Navigation Systems, the 00 minute, 02 second, 16 frame in absolute address of a navigation CD serves as an area called disk label.

Such data as illustrated in FIG. 7A are described in the disk label area. In particular, the disk label describes an identification of a volume structure at the position of an offset of 9 bytes from the top of the area, a version serial number of the volume structure at the position of an offset of 14 bytes, and a system identification at the position of an offset of 16 bytes.

Contents of data of the identification of the volume structure, the version serial number of the volume structure and the system identification are such as illustrated in FIG. 7B.

Figure 8:
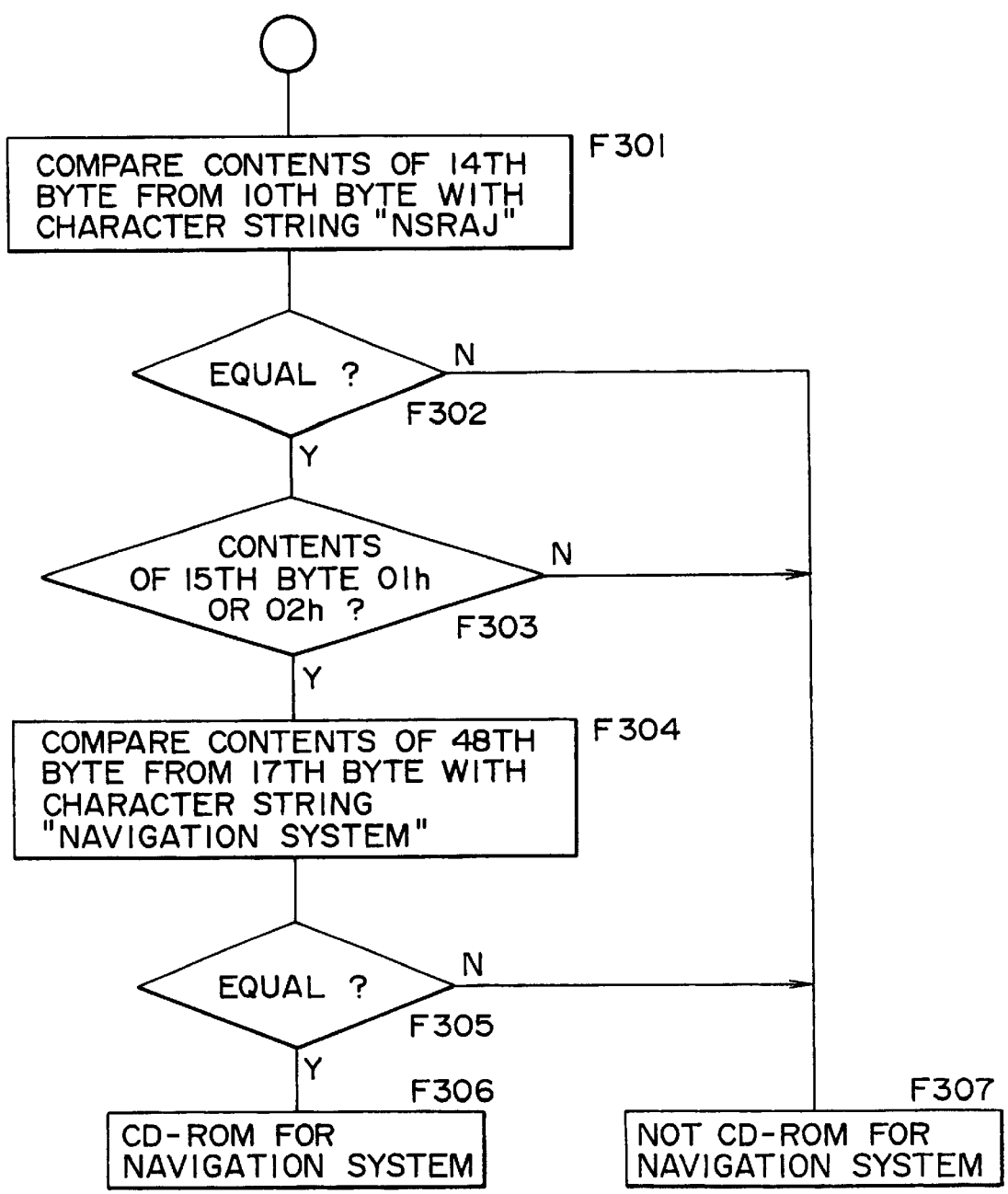
FIG. 8 is a flow chart illustrating navigation CD identification processing by the AV apparatus of FIG. 1.

In the discrimination processing in step F109, the CPU 12 performs such processing as illustrated in FIG. 8 based on such description as given above to effect discrimination whether or not the CD 10 is a navigation CD.

Referring to FIG. 8, first in step F301, the CPU 12 reads out contents in the 10th to 14th bytes of the disk label area and compares them with a character train of "NSRAJ". If the CD 10 is a navigation CD, then the contents of the 10th to 14th bytes of the disk label area are description of identification data of a volume structure as seen in FIG. 7B, and they are "NSRAJ". Accordingly, if coincidence is not detected in the comparison processing in step F301, then the processing of the CPU 12 advances from step F302 to step F307, in which the CPU 12 discriminates that the CD 10 is not a navigation CD. on the other hand, if coincidence is discriminated in step F302, then the CPU 12 discriminates contents of the 15th byte in step F303. In a navigation CD, the 15th bytes describe a version serial number of a volume structure as seen in FIG. 7B, and this is 01h or 02h. Therefore, if the contents of the 15th byte are not 01 nor 02, the processing of the CPU 12 advances from step F303 to step F307, in which the CPU 12 discriminates that the CD 10 is not a navigation CD.

If the contents of the 15th byte are 01h or 02h, then the CPU 12 reads out contents of the 17th to 48th bytes in step F304 and compares them with a character train of "NAVIGATION SYSTEM". In a navigation CD, the contents of the 15th to 48th bytes in the disk label area describe system identification data as seen in FIG. 7B, and they are "NAVIGATION SYSTEM". Accordingly, if coincidence is not discriminated in the comparison processing in step F304, then the processing of the CPU 12 advances from step F305 to step F307, in which the CPU 12 discriminates that the CD 10 is not a navigation CD.

On the other hand, if coincidence is discriminated in the comparison processing in step F304, then the CPU 12 discriminates in step F306 that the CD 10 is a navigation CD.

If it is discriminated, as a result of such processing as described above, in step F109 of FIG. 2 that the CD 10 is a navigation CD, then the CPU 12 advances its processing to step F110, in which it discriminates whether data to be read out are a natural picture recorded using a compression method called ΔYUV or video data such as map information.

When the data to be read out are video data such as map information, the CPU 12 advances its processing to step F111. Map video data of a navigation system are stored in units of a region (block) of a map defined by equally spaced altitude and longitude lines, and in order to allow scrolling display, it is sometimes required to display an image across adjacent blocks.

Therefore, in the present operation, video data of four adjacent blocks of a map including a region to be displayed are stored into a system memory in the CPU 12 so that the CPU 12 may fetch, as video data necessary for display, data of a matrix of pixels including 240 pixels in a column and 352 pixels in a row from video data for the 4 blocks on the system memory and writes the data into the memory 18.

Then, the CPU 12 controls so that outputting of display data is performed based on the contents of the video data written in the memory 18 to display a reproduced map image from the navigation CD on the monitor 2.

By the way, for data for drawing a map in a navigation system, a CLUT (Color Look-Up Table) is employed.

In particular, map video data read out from a navigation CD do not have the Y/U/V form but have a CLUT data form.

Figures 12, 13:
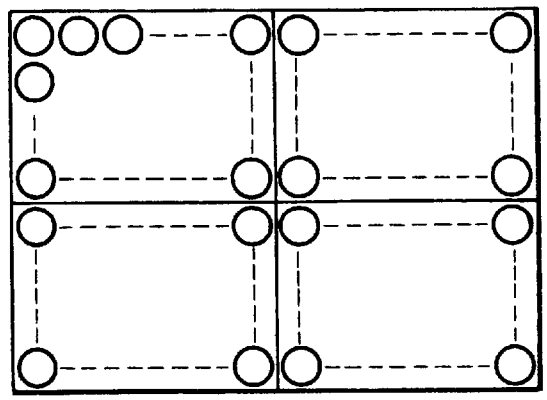
FIG. 12 is a diagrammatic view illustrating a fetching operation of CLUT data by the AV apparatus of FIG. 1 for displaying a map of a navigation CD.
FIG. 13 is a table showing a CLUT table of the AV apparatus of FIG. 1 for displaying a map of a navigation CD.

A color look-up table is a table in which CLUT values corresponding to values of Y/U/V signals for colors to be used to draw an image are stored as seen in FIG. 13 and Y/U/V signals for one pixel are represented as one CLUT value. Accordingly, the amount of data is reduced to ⅓.

Figure 10:
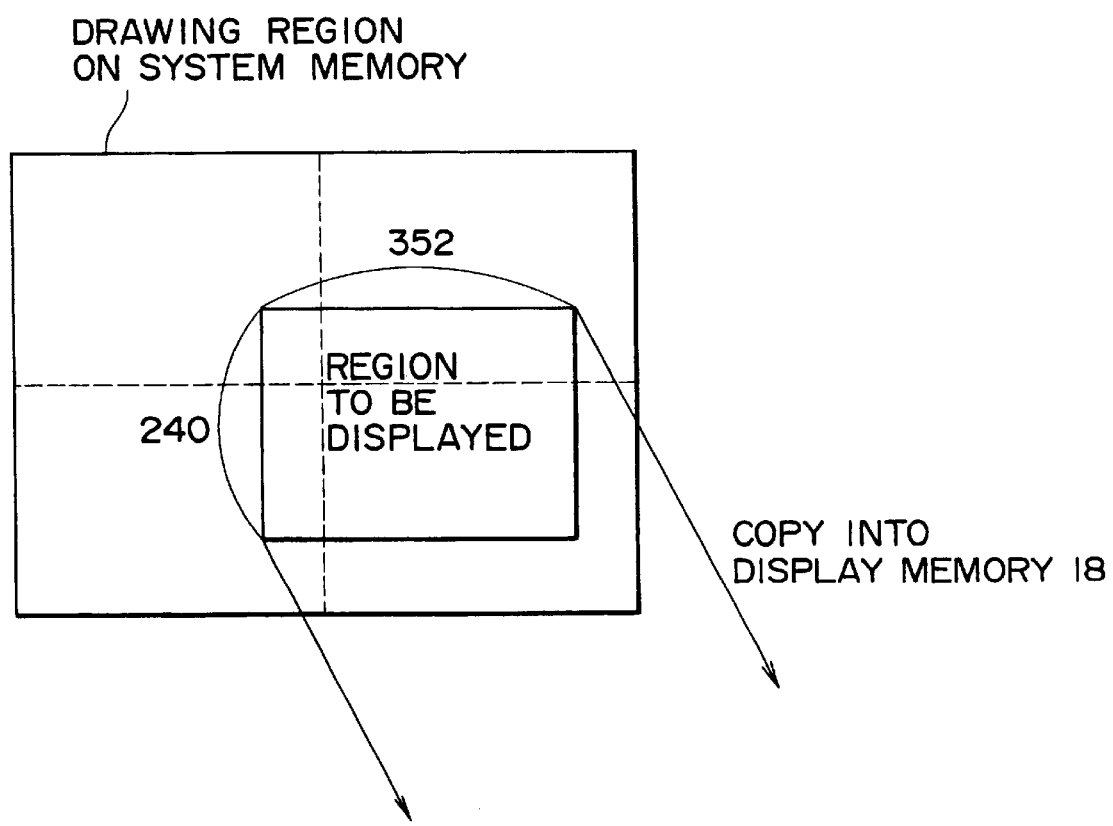
FIG. 10 is a diagrammatic view illustrating an operation of the AV apparatus of FIG. 1 for displaying a map of a navigation CD.

In the present operation, in order to save the area of the system memory to be used, when map video data of such four blocks as shown in FIG. 10 are stored into the system memory, CLUT data are used as they are as seen in FIG. 12. Consequently, the area necessary for the system memory is reduced to ⅓ comparing with the alternative case wherein map vide data of 4 blocks are fetched in the form of Y/U/V signals.

Figure 11:
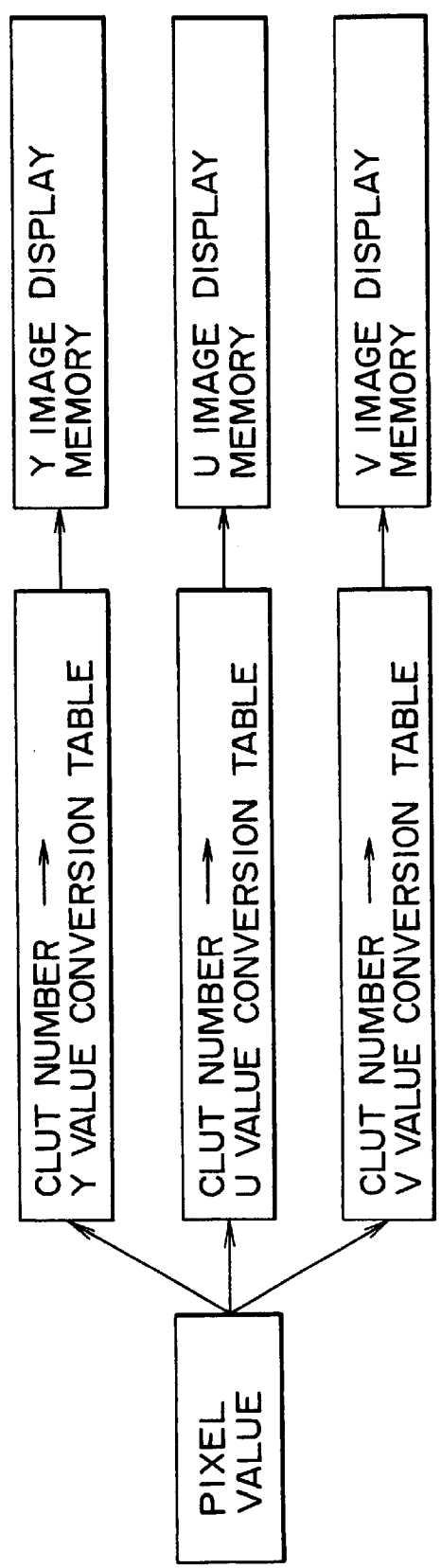
FIG. 11 is a flow diagram illustrating a CLUT data decoding operation of the AV apparatus of FIG. 1 for displaying a map of a navigation CD.

Then, when data for a matrix of pixels including 240 pixels in a column and 352 pixels in a row are fetched from the system memory and written into the memory 18, values of the Y signal/U signal/V signal are produced from the fetched CLUT data using the CLUT table of FIG. 13. The processing in this instance is illustrated in FIG. 11. In particular, based on a certain one pixel value, that is, CLUT data, the CLUT table of FIG. 13 is referred to to extract a corresponding Y signal value, and the Y signal value thus fetched is stored as a Y signal into the Y signal storage region 18a of the memory 18. Similarly, based on the same CLUT data, the CLUT table is referred to to extract a corresponding U signal value, and the U signal value is stored as a U signal into the U signal storage region 18b of the memory 18. Further, based on the same CLUT data, the CLUT table is referred to to extract a corresponding V signal value, and the V signal value is stored as a V signal into the V signal storage region 18c of the memory 18.

For example, if the CLUT data value of a certain pixel has a value "CL1", then where the CLUT table shown in FIG. 13 is used, the Y signal="Y1", the U signal="U1", and the V signal="V1". This processing is executed in step F112.

The Y signal, U signal and V signal obtained by conversion from the CLUT data in this manner have a data amount ratio of 1:1:1 as seen from FIG. 3C. In short, from the CLUT data for a matrix of pixels including 240 pixels in a column and 352 pixels in a row, the Y signal, U signal and V signal for the matrix including 240 pixels in a column and 352 pixels in a row are obtained.

Map video data provide an image having a high contrast similarly to a pattern image produced by computer graphics, and if they are stored into the memory 18 in such a condition that the data amounts of the Y signal, U signal and V signal have a ratio of 4:1:1, then blurring in color sometimes occurs. Therefore, in step F113, similarly as in the case of a letter and character broadcast, the Y signal is expanded to 4 times in data amount before it is written into the memory 18.

If it is assumed that one group GP1 in FIG. 9 corresponds to CLUT data of one pixel, then a Y signal value obtained from the CLUT data is allocated to the four image points (Y1, Y2, Y3, Y4) so that Y1=Y2=Y3=Y4 may be established.

In this manner, the entire same group GP1 is drawn as a square wherein 2 pixels in each column and 2 pixels in each row are painted up with the same color so that blurring in color may not occur. In other words, blurring in color on the screen when a map image is displayed is prevented.

If it is discriminated in step F110 that the video data to be read out are ΔYUV data, then the processing of the CPU 12 advances to ΔYUV processing in step F114. Such ΔYUV data are used to draw a natural picture in a navigation system and are utilized in order to compress the data amount by successively representing data as variations with respect to adjacent pixel data.

Figure 3D:
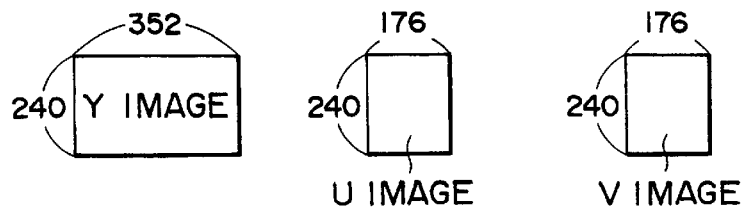

Image data obtained by decoding of the ΔYUV data exhibit a ratio in data amount of 4:2:2 among the Y signal, U signal and Y signal as seen in FIG. 3D.

The Y signal provides data of a matrix including 240 pixels in a column and 352 pixels in a row, and the U signal and V signal provide data of another matrix including 240 pixels in a column and 176 pixels in a row.

Since ΔYUV data are applied to a natural picture, scrolling display as is required for a map image need not be used. Therefore, the CPU 12 does not store video data for 4 blocks into the system memory in order to extract necessary data later, but merely transfers decoded data to the memory 18.

The form of the data stored in the memory 18 exhibits a ratio in data amount of 4:1:1 among the Y signal, U signal and V signal, and the Y signal has data of a matrix of pixels including 480 pixels in a column and 704 pixels in a row while the U signal and the V signal have data of another matrix including 240 pixels in a column and 352 pixels in a row.

Thus, the CPU 12 expands, as the processing in step F115, the decoded video data for the Y signal to 4 times and expands the decode video data for the U and V signals to 2 times before it stores them into the memory 18.

This operation will be described with reference to FIG. 14. FIG. 14 schematically shows states (spatial arrangements) of individual pixels of a display image similarly to FIG. 9, and in FIG. 14, the mark "○" represents a Y image point and the mark "□" represents a U or V image point.

As described hereinabove with reference to FIG. 9, one U or V image point is arranged for 4 Y image points (Y1, Y2, Y3, Y4), and one group GP1 is formed from those 5 image points.

The operation of storing a Y signal into the memory 18 after it is expanded to 4 times is, similarly as in the case of a letter and character broadcast described hereinabove, to produce, from one Y signal value, four Y signal data of an equal value and use those Y signal data as data of the Y image points (Y1, Y2, Y3, Y4) in one group. Thus, the brightness data values satisfy Y1=Y2=Y3=Y4.

Meanwhile, the U and Y signals are stored into the memory 18 after they are expanded to 2 times. This is to produce, from one U or V signal value, two U or V signal data of an equal value and use the two U or V signal data as data of adjacent pixels. In particular, one group GP2 is formed from U or V image points between each adjacent pixels as seen in FIG. 14, and an equal value is provided the U or V signals of the two U and V image points included in the group GP2.

By such operation as described above, an image from ΔYUV data can be outputted using the memory 18.

While the preferred embodiment of the present invention is described above, the present invention allows display of images from further various image sources using the memory 18. For example, different types of CD-ROMs known as electronic books, digital video tape recorders and so forth can be used for the image source.

Having now fully described the invention, it will be apparent to one of ordinary skill in the art that many changes and modifications can be made thereto without departing from the spirit and scope of the invention as set forth herein.

What is claimed is:

1. A reproducing apparatus for reproducing a video signal from a plurality of video signal sources, comprising:

reproducing means for reproducing data from any one of a plurality of different types of recording media;

discriminating means for discriminating said type of recording media in accordance with said reproduced data and for discriminating a type of video data included in said reproduced data;

decoding means for decoding said video data in accordance with said discriminated type of recording media and video data and/or for decoding a broadcasting data received and demodulated by receiving means;

control means for selectively changing said decoded data corresponding to said decoded data format;

memory means for storing said changed data;

converting means for converting said stored data into a predetermined format of a video signal;

wherein said control means is adapted to change said decoded data to expand at least brightness data included in the decoded data, said brightness data to be selectively expanded in accordance with a difference between a ratio of said brightness data and said color data in said decoded data format and a data format corresponding to said predetermined format.

2. The reproducing apparatus according to claim 1, wherein the video data to be stored into said memory means are formed from brightness signal data and color signal data, and based on the discrimination of disk type by said discriminating means, performs conversion processing of the video data in accordance with its type such that the brightness signal data has a resolution substantially equal to that of the color signal data and then writes the video data obtained by the conversion processing into said memory means.

3. The reproducing apparatus according to claim 1, wherein the video data recorded on one of the plurality of disk types includes a photographic CD signal recorded on a CD-ROM disk.

4. The reproducing apparatus according to claim 1, wherein a letter and character signal received from a television broadcast also is reproduced.

5. The reproducing apparatus according to claim 1, wherein a letter and character signal received from an FM multiplex broadcast also is reproduced.

* * * * *